UNITED STATES PATENT OFFICE.

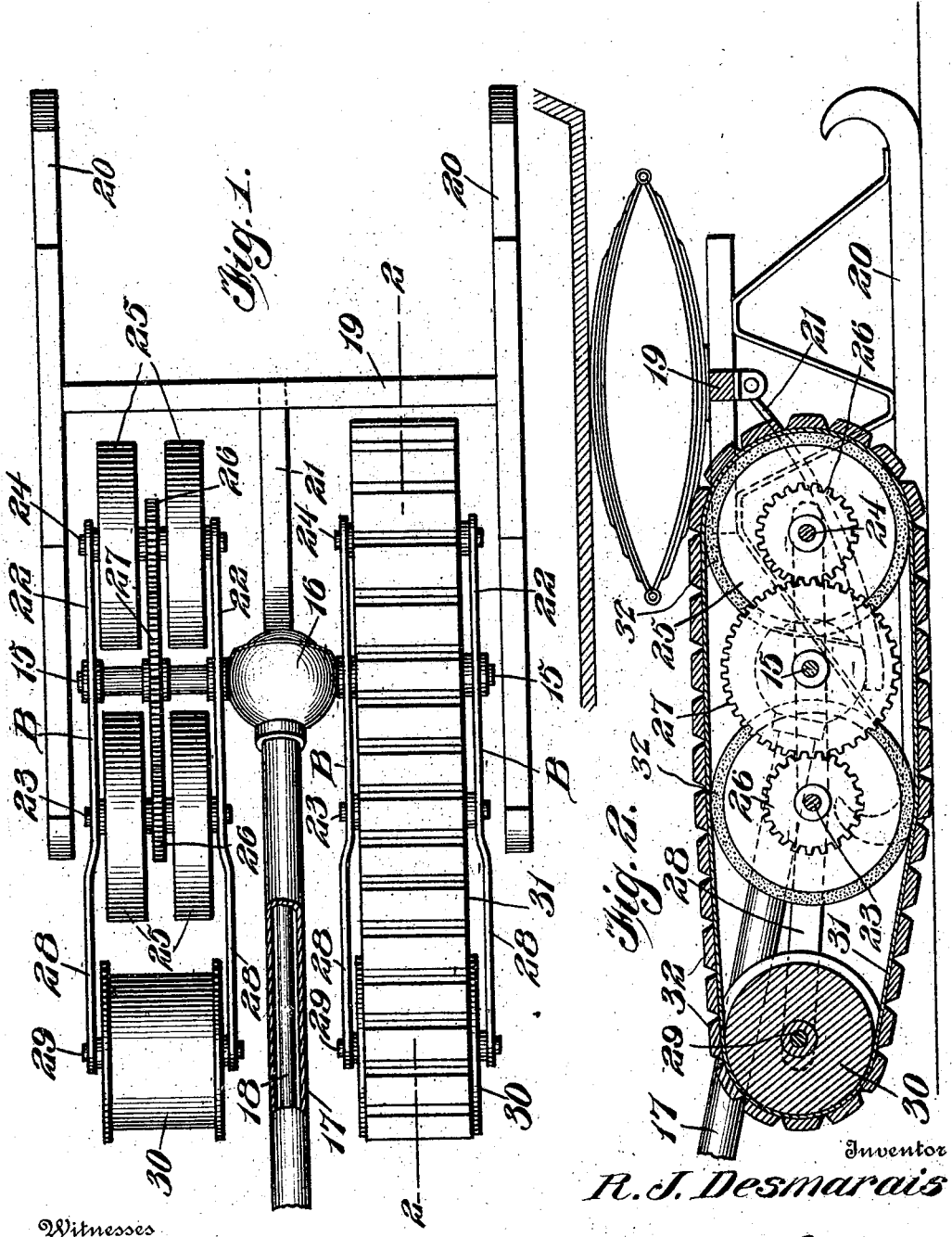

REGINALD J. DESMARAIS, OF FARIBAULT, MINNESOTA.

PROPULSION DEVICE FOR MOTOR-SLEDS.

1,216,962.   Specification of Letters Patent.   Patented Feb. 20, 1917.

Application filed May 16, 1916.  Serial No. 97,911.

*To all whom it may concern:*

Be it known that I, REGINALD J. DESMARAIS, a citizen of the United States, residing at Faribault, in the county of Rice and State of Minnesota, have invented new and useful Improvements in Propulsion Devices for Motor-Sleds, of which the following is a specification.

This invention relates to motor sleds, and it has particular reference to a simple and improved propulsion device to be used in connection therewith.

A further object of the invention is to produce a propulsion device adaptable to conventional automobile construction and whereby an automobile mounted on runners may be rapidly and safely propelled.

A further object of the invention is to simplify and improve the construction and operation of the propulsion device *per se.*

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a plan view of the improved propulsion device showing also a pair of runners, parts having been removed for the purpose of exposing subjacent parts.

Fig. 2 is a longitudinal sectional view taken on the line 2—2 in Fig. 1.

Corresponding parts in both figures of the drawing are denoted by like characters of reference.

Referring to the drawing, 15 designates the main driven shaft or live shaft which receives motion from a suitable source of power through a differential contained in a housing 16 and a driving shaft contained in a tubular housing 17, a portion of said driving shaft being seen at 18. The body of the sleigh or vehicle, which is seen in the drawings, is intended to be supported on a cross bar or beam 19 which in turn is supported on the runners 20. A leaf spring 21, one end of which is connected with the housing 16 has its other end connected with the cross bar 19.

The live shaft 15 supports two frames B, one of said frames being positioned at either side of the housing 16 between said housing and one of the runners 20. These frames being of like construction, the description of one will suffice. Each frame B is composed of side members 22 having bearings for front and rear shafts 23, 24, said shafts being located, respectively, to the forward and to the rearward of the live shaft 15. Each of the shafts 23, 24 carries a pair of wheels or drums 25 and a pinion or spur wheel 26, said spur wheels being both in mesh with a spur wheel 27 mounted on the live shaft and serving to drive the shafts 23, 24 carrying the wheels 25. The frame members 22 are provided with forward extensions which are preferably slightly upturned, said extensions being designated by 28. These extensions serve to support an idle shaft 29 carrying a flanged drum or guide wheel 30. Trained over the wheels 25 and also over the flanged wheel or drum 30 is an endless belt 31 which is provided with earth engaging blocks 32 which may be of wood, rubber or any other suitable material or combinations of materials, said blocks having beveled edges, as seen at 33, so that the interspaces between said blocks will not become packed or obstructed by dirt. It will be seen that the forward end portions of the belts 31 will be raised above the ground, this being due partly to the fact that the forward extensions 28 of the side members 22 are slightly upturned, as shown, and also partly to the fact that the flanged guide wheel 30 is of a diameter considerably less than the diameter of the wheels 25.

It will be seen from the foregoing description that the frames B are mounted on the live shaft for pivotal or rocking movement and that consequently those portions of the belts that extend between the lower portions of the wheels 25 will contact with the ground. When the live shaft 15 is driven motion will be transmitted by the spur wheels 27 to the pinions 26 on the shafts carrying the wheels 25, thus driving said wheels and imparting motion to the endless belt, the earth engaging portion of which will cause the device to travel over the ground. When the travel is in a forward direction, as is usually the case, the presence of the elevated guide wheels 30 will assist in enabling the belts to surmount obstructions of any kind. It is obvious that within the scope of the invention similar guide wheels might be arranged at the rearward ends of the frames, but this is not usually considered necessary. The blocks with which the belts are shod will assist materially in taking a good hold of the ground. Some of said blocks might, when the device is intended to travel over ice, be equipped with spikes or calks, but as such devices are well known it is not considered necessary to particularly illustrate the same.

The wheels 25 over which the endless belts 31 are trained and whereby said belts are driven are preferably provided with solid rubber tires, as shown at 32, for the purpose of giving proper traction and also to protect the machinery from any sudden shock or jolt.

Having thus described the invention, what is claimed as new, is:—

In a device of the class described, a runner frame including runners and a cross bar with which the runners are connected, a live shaft, means for driving the live shaft including a differential contained within a housing and a main driven shaft, a leaf spring connecting the housing with the runner frame, rocking frames mounted on the live shaft between the housing and the runners, wheel carrying shafts supported by the rocking frames, means for transmitting motion to the wheel carrying shafts from the live shaft, and endless belts trained over the wheels of the respective rocking frames and having earth engaging blocks connected therewith.

In testimony whereof I affix my signature.

REGINALD J. DESMARAIS.